(12) United States Patent
Allan et al.

(10) Patent No.: US 12,509,138 B2
(45) Date of Patent: Dec. 30, 2025

(54) STEERING FEEDBACK CONTROL FOR VEHICLE STEER-BY-WIRE SYSTEMS

(71) Applicant: GM GLOBAL TECHNOLOGY OPERATIONS LLC, Detroit, MI (US)

(72) Inventors: Alexander Milne Allan, Howell, MI (US); Ibrahim A. Badiru, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 240 days.

(21) Appl. No.: 18/319,233

(22) Filed: May 17, 2023

(65) Prior Publication Data

US 2024/0383522 A1 Nov. 21, 2024

(51) Int. Cl.
*B62D 5/00* (2006.01)
*B62D 6/00* (2006.01)

(52) U.S. Cl.
CPC .............. *B62D 5/006* (2013.01); *B62D 6/008* (2013.01)

(58) Field of Classification Search
CPC ........ B62D 5/006; B62D 6/008; B62D 5/001; B62D 6/007; B62D 6/002
USPC .......................................................... 701/42
See application file for complete search history.

(56) References Cited

U.S. PATENT DOCUMENTS

| | | | | |
|---|---|---|---|---|
| 2018/0170326 A1* | 6/2018 | Wang | ........................ | B60T 7/10 |
| 2018/0362074 A1* | 12/2018 | Badiru | ................... | B62D 5/001 |
| 2019/0375451 A1* | 12/2019 | Badiru | ................... | B62D 6/002 |
| 2020/0001914 A1* | 1/2020 | Yu | ......................... | G01M 17/06 |
| 2023/0322208 A1* | 10/2023 | Rojas | .............. | B60W 30/18163 |
| | | | | 701/41 |

\* cited by examiner

*Primary Examiner* — Lindsay M Low
*Assistant Examiner* — Omar Morales

(57) ABSTRACT

A vehicle steer-by-wire system includes two front wheels of the vehicle, a steering wheel adapted to receive a steering input, and a steer-by-wire module configured to electronically transmit a steering signal to control a steering orientation of the two front wheels according to the steering input received at the steering wheel, sense a feedback parameter of the two front wheels, and supply a steering feedback signal to the steering wheel according to the sensed feedback parameter of the two front wheels. The system includes one or more vehicle sensors configured to sense at least one operating parameter of the vehicle, and a steering feedback control module configured to receive the at least one operating parameter of the vehicle, determine a driving intensity index according to the at least one operating parameter, and modify the steering feedback signal supplied to the steering wheel according to the determined driving intensity index.

14 Claims, 6 Drawing Sheets

STEERING FEEDBACK CONTROL FOR VEHICLE STEER-BY-WIRE SYSTEMS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure generally relates to steering feedback control for vehicle steer-by-wire systems.

Some vehicles include a steer-by-wire system, which may use servos that interface with wheels of the vehicle, in order to allow the wheels of the vehicle to be steered without a mechanical linkage between the vehicle wheels and the steering wheel. Driving inputs to the steering wheel are detected, and electronic signals are transmitted to control a steering orientation of the wheels.

SUMMARY

A vehicle steer-by-wire system includes two front wheels of the vehicle, a steering wheel adapted to receive a steering input from a driver of the vehicle, and a steer-by-wire module configured to electronically transmit a steering signal to control a steering orientation of the two front wheels according to the steering input received at the steering wheel, sense a feedback parameter of the two front wheels, and supply a steering feedback signal to the steering wheel according to the sensed feedback parameter of the two front wheels. The system includes one or more vehicle sensors configured to sense at least one operating parameter of the vehicle, and a steering feedback control module configured to receive the at least one operating parameter of the vehicle, determine a driving intensity index according to the at least one operating parameter, and modify the steering feedback signal supplied to the steering wheel according to the determined driving intensity index.

In other features, the system includes at least one steering actuator configured to control the steering orientation of the front two wheels, wherein the steer-by-wire module is configured to transmit the steering signal to the at least one steering actuator to control the steering orientation of the two front wheels.

In other features, the at least one operating parameter includes at least one of a vehicle speed, a throttle position, a brake pedal position, a steering wheel angle, a steering velocity, a lateral acceleration, a driver mode setting, a load shed request value, and a vehicle location.

In other features, the at least one operating parameter includes at least three operating parameters of the vehicle speed, the throttle position, the brake pedal position, the steering wheel angle, the steering velocity, the lateral acceleration, the driver mode setting, the load shed request value, and the vehicle location.

In other features, the steering feedback control module is configured to receive each of the at least three operating parameters at periodic intervals to define a dataflow for each of the at least three operating parameters, and convert values in each dataflow to a same scale to combine the at least five operating parameters.

In other features, the steering feedback control module is configured to convert the values in each dataflow using a sigmoid activation function to convert the values to a scale from zero to one.

In other features, the steering feedback control module is configured to calculate a moving average of each scaled dataflow, and combine moving averages via convolution to determine the driving intensity index on scale from zero to one.

In other features, each moving average includes at least a last ten seconds of operating parameters received at the periodic intervals. In other features, the steering feedback control module is configured to modify the steering feedback signal by applying a filter to the steering feedback signal according to the determined driving intensity index.

In other features, the steering feedback control module is configured to override the filter and supply the steering feedback signal to the steering wheel without modification according to at least one of a location of the vehicle, a driver mode setting of the vehicle, and a load shed request value.

A vehicle steer-by-wire system includes two front wheels of the vehicle, at least one steering actuator configured to control a steering orientation of the front two wheels, a steering wheel adapted to receive a steering input from a driver of the vehicle, and a steer-by-wire module configured to electronically transmit a steering signal to the at least one steering actuator to control the steering orientation of the two front wheels according to the steering input received at the steering wheel, sense a feedback parameter of the two front wheels, and supply a steering feedback signal to the steering wheel according to the sensed feedback parameter of the two front wheels. The system includes one or more vehicle sensors configured to sense at least one operating parameter of the vehicle, and a steering feedback control module configured to receive the at least one operating parameter of the vehicle, and determine a driving intensity index according to the at least one operating parameter, wherein the at least one operating parameter includes at least one of a vehicle speed, a throttle position, a brake pedal position, a steering wheel angle, a steering velocity, a lateral acceleration, a driver mode setting, a load shed request value, and a vehicle location.

In other features, the at least one operating parameter includes at least three operating parameters of the vehicle speed, the throttle position, the brake pedal position, the steering wheel angle, the steering velocity, the lateral acceleration, the driver mode setting, the load shed request value, and the vehicle location.

In other features, the steering feedback control module is configured to receive each of the at least three operating parameters at periodic intervals to define a dataflow for each of the at least three operating parameters, and convert values in each dataflow to a same scale to combine the at least five operating parameters.

In other features, the steering feedback control module is configured to convert the values in each dataflow using a sigmoid activation function to convert the values to a scale from zero to one.

In other features, the steering feedback control module is configured to calculate a moving average of each scaled dataflow, and combine moving averages via convolution to determine the driving intensity index on scale from zero to one. In other features, each moving average includes at least a last ten seconds of operating parameters received at the periodic intervals.

A method of operating a vehicle steer-by-wire system includes receiving, at a steering wheel of a vehicle, a steering input from a driver of the vehicle, electronically transmitting, by a steer-by-wire module, a steering signal to control a steering orientation of two front wheels of the vehicle, according to the steering input received at the steering wheel, sensing a feedback parameter of the two front wheels, supplying a steering feedback signal to the steering wheel according to the sensed feedback parameter of the two front wheels, sensing at least one operating parameter of the vehicle, determining a driving intensity index according to the at least one operating parameter, and modifying the steering feedback signal supplied to the steering wheel according to the determined driving intensity index.

In other features, the at least one operating parameter includes at least one of a vehicle speed, a throttle position, a brake pedal position, a steering wheel angle, a steering velocity, a lateral acceleration, a driver mode setting, a load shed request value, and a vehicle location.

In other features, modifying the steering feedback signal includes applying a filter to the steering feedback signal according to the determined driving intensity index.

In other features, the method includes overriding the filter and supplying the steering feedback signal to the steering wheel without modification according to at least one of a location of the vehicle, a driver mode setting of the vehicle, and a load shed request value.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
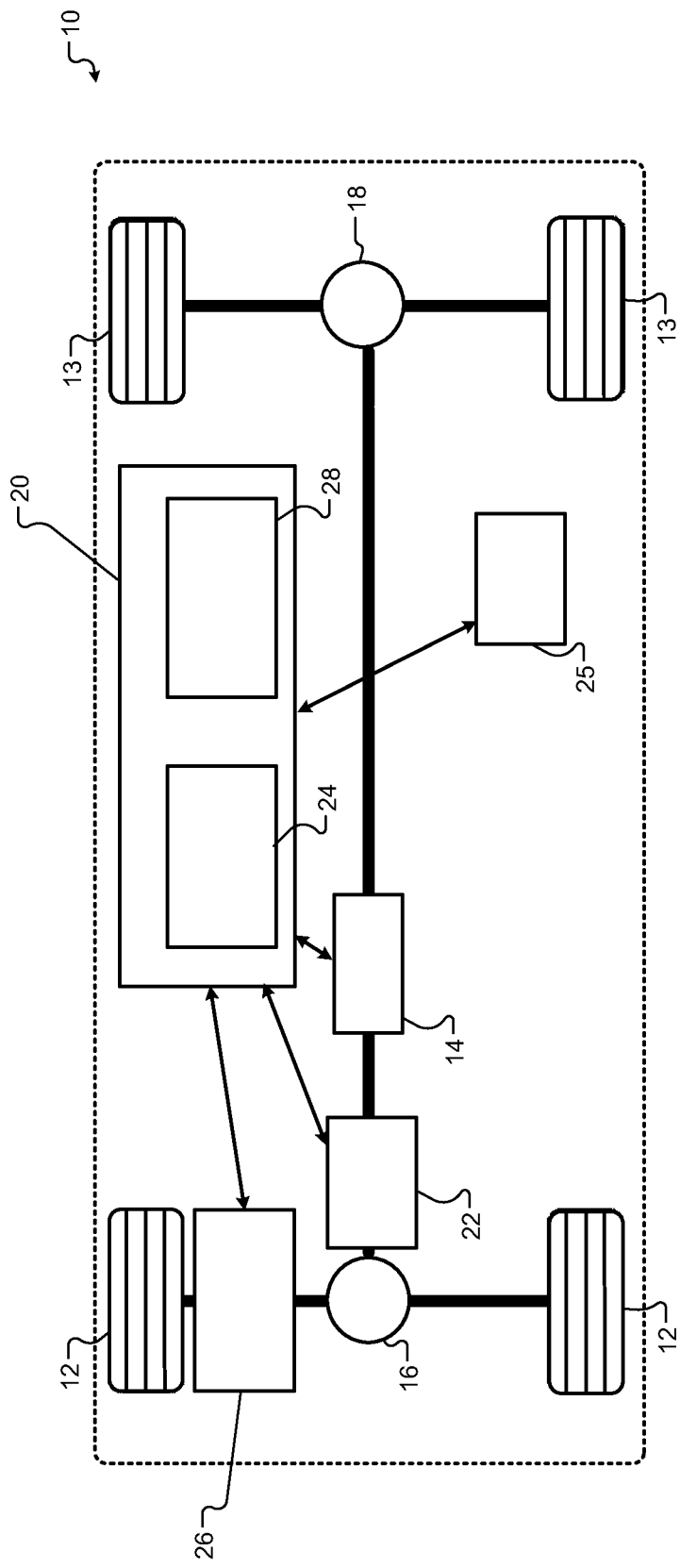
FIG. 1 is a functional block diagram of an example embodiment of a vehicle including steering feedback control for a vehicle steer-by-wire system.

Some example embodiments described herein include a steer-by-wire system for a vehicle, where there may be no mechanical connection between the steering wheel of the vehicle and the steering actuator for controlling a steering orientation of the wheels (e.g., a steering orientation of the two front wheels of the vehicle). A steer-by-wire control module may transmit an electronic signal to the steering actuator according to a driving input received at the steering wheel from a driver of the vehicle, in order to electronically control steering of the vehicle wheels.

In some example embodiments, a steer-by-wire control module may be configured to modify an amount of feedback the driver receives (e.g., an amount of high frequency steering feedback, etc.). For example, the steer-by-wire control module may be configured to modify a level of steering tactile feedback in response to steering rack load variation, based on automatically detecting driving characteristics. Tactile steering feedback may be scaled according to a driving intensity index (D.I.I.), which may be calculated based on one or more sensed operating parameters of the vehicle to quantify, e.g., a level of driving aggressiveness.

For example, real-time vehicle data, such as moving averages of sensed vehicle operating parameters, may be used to calculate the driving intensity index. Then instead of using a fixed feedback response, the steer-by-wire control module modifies steering feedback characteristics according to the driver intensity index.

Any suitable vehicle operating parameters may be used to calculate the driving intensity index, including but not limited to, a speed of the vehicle, a throttle position (e.g., how far a throttle or accelerator pedal is pressed by the driver), a brake pedal position (e.g., how far or hard the brake pedal is pressed by the driver), a steering wheel angle (e.g., an amount of steering wheel rotation relative to a straight and neutral steering wheel position), a steering velocity (e.g., a speed at which the steering wheel is rotated), a lateral acceleration of the vehicle, a driver mode setting (e.g., such as a track mode, sport mode, etc. selected by a driver), a load shed request value (e.g., when one or more operating systems of the vehicle are requesting increased resources for critical vehicle functions and less resources for non-critical vehicle functions), a location of the vehicle (e.g., based on global positioning system (GPS) coordinates), etc. The steer-by-wire control module may calculate the driving intensity index based on one or more (or none) of the above vehicle operating parameters (or other suitable vehicle operating parameters), such as at least three of the above vehicle operating parameters, at least five of the above vehicle operating parameters, all of the above vehicle operating parameters, etc.

In some example embodiments, each sensed vehicle operating parameter may be obtained at periodic intervals, to define incoming dataflows for each vehicle operating parameter. The incoming dataflows may be scaled in order to combine the parameters, such as a conversion to a scale from zero to one using a sigmoid activation function.

The steer-by-wire control module may be configured to take a moving average of each incoming dataflow, such as five second moving averages, ten second moving averages, one minute moving averages, etc. The steer-by-wire control module may combine parameters using any suitable algorithm, such as convoluting the scaled dataflows into a driving intensity index on a scale from zero to one (or any other suitable scale range).

In various implementations, the steer-by-wire control module may automatically select a road feedback filter setting, based on, e.g., a moving average of the driving intensity index (such as a five second moving average), may scale an existing filter in proportion to a real-time driving intensity index value, etc.

The steer-by-wire control module may be configured to execute a filter setting override, to inhibit modification of the steering feedback control signal based on certain criteria. For example, the steer-by-wire control module may override the filter setting based on a location of the vehicle, such as setting the steering feedback control signal to a full feedback or maximum feedback amount in response to GPS coordinates indicating the vehicle is at a location of a racetrack, etc.

The steer-by-wire control module may override the filter setting based on a driver mode setting or command (DMC), such as setting the steering feedback control signal to a full feedback or maximum feedback amount in response to a driver selecting a track driving mode or a sport driving mode, etc. When the steer-by-wire control module overrides the filter setting, the full steering feedback may be provided to the driver regardless of the current driving intensity index.

As another example, the steer-by-wire control module may override the filter setting based on a load shed request value. For example, if critical vehicle systems are requesting that non-critical vehicle systems reduce resource usage, the steer-by-wire control module may stop calculating the driving intensity index temporarily, may stop modifying steering feedback, etc.

The steer-by-wire control module may apply a filter by using, e.g., an active filter on a rack fore reading from one or more steering feedback sensors. For example, one or more vehicle sensors may monitor steering feedback parameters, such as a rack force, for electronically supplying steering feedback to the steering wheel.

The steer-by-wire control module may selectively apply an active filter to the steering feedback signal based on, e.g., the driving intensity index, to determine how much of the steering feedback signal should be relayed to the driver via the steering wheel (e.g., via vibration of the steering wheel, force applied to rotate or inhibit rotation of the steering wheel, etc.), and how much of the steering feedback signal should be rejected or inhibited.

For example, the driving intensity index may be indicative of whether a driver is driving aggressively, or in a more casual manner. If the sensed vehicle operating parameters generate a driving intensity index value that is low, such as during casual highway driving, the steer-by-wire control module may filter out most or all of the steering feedback control signal in order to provide a smoother driving experience. If the sensed vehicle operating parameters generate a driving intensity index value that is high, such as during fast and sharp vehicle turns, the steer-by-wire control module may allow most or all of the steering feedback control signal to be passed to the steering wheel in order to provide an increased steering feel and performance feel for the driver.

In contrast to a static driving mode selection, in some example embodiments the steer-by-wire control module may continuously update the driving intensity index over time based on vehicle operating parameters that are monitored periodically in real-time, to continuously modify the steering feedback during driving. Each vehicle operating parameter may have its own scaling function, and the parameters may be combined using any suitable algorithm such as convolution (e.g., multiplication) of the different sensed vehicle operating parameters.

In some example embodiments, a steer-by-wire (SBW) system may be configured to detect a driver's manipulation of a steering wheel electronically, instead of using a mechanical structure to connect the steering wheel and wheels. The SBW system then generates control signals to control a steering orientation of the wheels using the signals.

For example, the steer-by-wire system may include a steering angle sensor for detecting the steering angle of the steering wheel, a torque sensor for sensing the torque of a steering wheel shaft, a reaction motor for providing reaction torque according to the rotation of the steering wheel, etc. The system may include a steering output sensor for detecting a rotational angle of the wheel, a steering motor for generating force to facilitate turning of the wheel, a steering motor position sensor for sensing the position of a rotational shaft of the steering motor, etc.

When the driver turns the steering wheel, the amount of rotation of the steering wheel and torque of a torsion bar, which are sensed by the steering angle sensor and a torque sensor, may be transmitted to a vehicle control module, where the vehicle control module is configured to generates current, signals, etc., for controlling a steering orientation of the wheels, which may be provided to a wheel steering actuator (e.g., a steering motor), in order to steer the wheels.

Referring now to FIG. 1, a vehicle 10 includes front wheels 12 and rear wheels 13. In FIG. 1, a drive unit 14 selectively outputs torque to the front wheels 12 and/or the rear wheels 13 via drive lines 16, 18, respectively. The vehicle 10 may include different types of drive units. For example, the vehicle may be an electric vehicle such as a battery electric vehicle (BEV), a hybrid vehicle, or a fuel cell vehicle, a vehicle including an internal combustion engine (ICE), or other type of vehicle.

Some examples of the drive unit 14 may include any suitable electric motor, a power inverter, and a motor controller configured to control power switches within the power inverter to adjust the motor speed and torque during propulsion and/or regeneration. A battery system provides power to or receives power from the electric motor of the drive unit 14 via the power inverter during propulsion or regeneration.

While the vehicle 10 includes one drive unit 14 in FIG. 1, the vehicle 10 may have other configurations. For example, two separate drive units may drive the front wheels 12 and the rear wheels 13, one or more individual drive units may drive individual wheels, etc. As can be appreciated, other vehicle configurations and/or drive units can be used.

The vehicle control module 20 may be configured to control operation of one or more vehicle components, such as the drive unit 14 (e.g., by commanding torque settings of an electric motor of the drive unit 14). The vehicle control module 20 may receive inputs for controlling components of the vehicle, such as signals received from a steering wheel 22, an acceleration paddle, etc. The vehicle control module 20 may monitor telematics of the vehicle for safety purposes, such as vehicle speed, vehicle location, vehicle braking and acceleration, etc.

The vehicle control module 20 may receive signals from any suitable components for monitoring one or more aspects of the vehicle, including one or more vehicle sensors 25 (such as cameras, microphones, pressure sensors, wheel position sensors, brake and acceleration pedal position sensors, accelerometers, steering wheel angle and velocity sensors, light detection and ranging (Lidar) sensors, suspension position sensors, etc.). The vehicle control module 20 may communicate with another device via a wireless communication interface, which may include one or more wireless antennas for transmitting and/or receiving wireless communication signals. For example, the wireless communication interface may communicate via any suitable wireless communication protocols, including but not limited to vehicle to vehicle (V2V) communication, vehicle to load (V2L) communication, Wi-Fi communication, wireless area network (WAN) communication, cellular communication, personal area network (PAN) communication, short-range wireless communication (e.g., Bluetooth), etc. The wireless communication interface may communicate with a remote computing device over one or more wireless and/or wired networks.

As shown in FIG. 1, the vehicle control module 20 may include a steer-by-wire control module 24. The steer-by-wire control module 24 may be configured to control a steering orientation of the front wheels 12 using, e.g., a wheel steering actuator 26. For example, the steer-by-wire control module 24 may transmit an electronic signal to the wheel steering actuator 26 according to a steering input received from a driver of the vehicle 10 via the steering wheel 22. As used herein, a 'steering wheel' may refer to any device for controlling steering of the vehicle, such as a rotatable wheel, a steering yoke, etc.

In some example embodiments, the steer-by-wire module 24 may be configured to sense a feedback parameter of the front wheels 12 (e.g., via one or more of the vehicle sensors 25), and supply a steering feedback signal to the steering wheel 22 according to the sensed feedback parameter of the front wheels 12. For example, one or more vibration elements, motors, actuators, etc. may be used to apply a rotation force or inhibit a rotation of the steering wheel 22, to cause vibration of the steering wheel 22, etc., to simulate steering feedback based on an interaction of the front wheels 12 with the road that may have otherwise occurred if the steering wheel 22 was mechanically connected to the front wheels 12 (e.g., via a mechanical steering connection between the steering wheel 22 and the front wheels 12).

The vehicle control module 20 also includes a steering feedback control module 28. The steering feedback control module 28 may be configured to receive at least one operating parameter of the vehicle 10 (such as via one or more of the vehicle sensors 25), and determine a driving intensity index according to the at least one operating parameter. The steering feedback control module 28 may be configured to modify the steering feedback signal supplied to the steering wheel 22 according to the determined driving intensity index.

For example, the steering feedback control module 28 may be configured to apply one or more filters to a steering feedback signal supplied from the steer-by-wire module 24 to the steering wheel 22, according to the determined driver intensity index. Although FIG. 1 illustrates the vehicle control module 20 as including the steer-by-wire control module 24 and the steering feedback control module 28, in other example embodiments, each module may be separate, one or more modules may be combined, functionality described herein may be shared across modules or distributed across modules in a different manner, etc.

Figure 2:
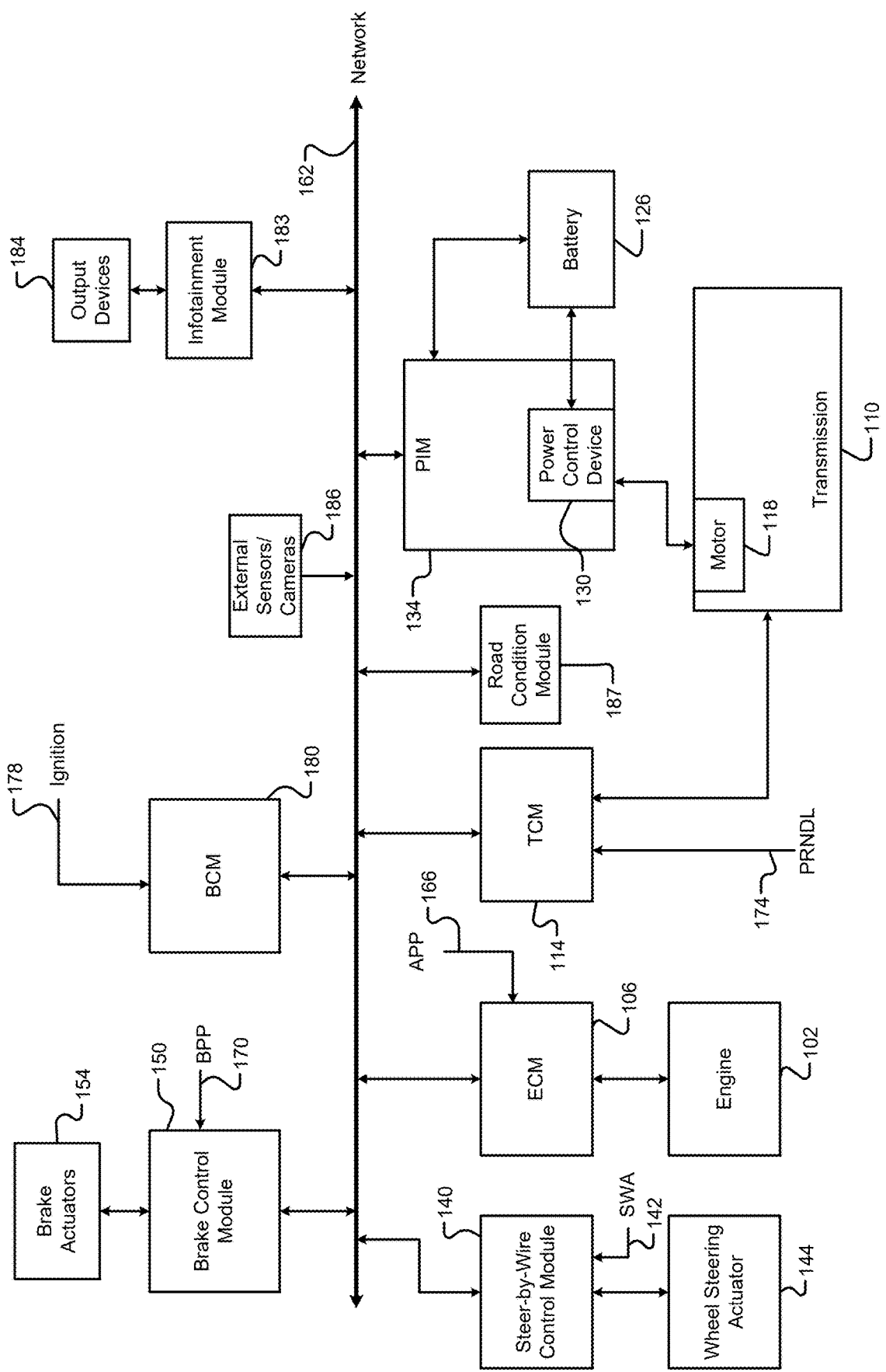
FIG. 2 is a functional block diagram of an example vehicle system.

Referring now to FIG. 2, a functional block diagram of an example vehicle including a steer-by-wire system is presented, which may be similar to the vehicle 10 of FIG. 1. While a vehicle system for a hybrid vehicle is shown and will be described, the present application is also applicable to non-hybrid vehicles, electric vehicles, fuel cell vehicles, and other types of vehicles. The present application is applicable to autonomous vehicles, semi-autonomous vehicles, non-autonomous vehicles, shared vehicles, non-shared vehicles, and other types of vehicles.

An engine 102 may combust an air/fuel mixture to generate drive torque. An engine control module (ECM) 106 controls the engine 102. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators. In some types of vehicles (e.g., electric vehicles), the engine 102 may be omitted.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system may include one or more electric motors. For example, an electric motor 118 may be implemented within the transmission 110 as shown in the example of FIG. 2. An electric motor can act as either a generator or as a motor at a given time. When acting as a generator, an electric motor converts mechanical energy into electrical energy. The electrical energy can be, for example, used to charge a battery 126 via a power control device (PCD) 130. When acting as a motor, an electric motor generates torque that may be used, for example, to supplement or replace torque output by the engine 102. While the example of one electric motor is provided, the vehicle may include zero or more than one electric motor.

A power inverter module (PIM) 134 may control the electric motor 118 and the PCD 130. The PCD 130 applies power from the battery 126 to the electric motor 118 based on signals from the PIM 134, and the PCD 130 provides power output by the electric motor 118, for example, to the battery 126. The PIM 134 may include, for example, an inverter.

A steer-by-wire control module 140 controls steering/turning of wheels of the vehicle, for example, based on driver turning of a steering wheel within the vehicle and/or steering commands from one or more vehicle control modules. A steering wheel angle (SWA) sensor (not shown) monitors rotational position of the steering wheel and generates a SWA 142 based on the position of the steering wheel. As an example, the steer-by-wire control module 140 may control vehicle steering by transmitting a steering orientation control signal to a wheel steering actuator 144 based on the SWA 142. The wheel steering actuator 144 may include an electronic power steering (EPS) motor, may be driven by an EPS motor that receives a signal from the steer-by-wire control module 140, etc.

A brake control module 150 may controls actuation of brake actuators 154 (brake actuator modules) of the vehicle based on one or more driver inputs, such as a brake pedal position (BPP) 170. The brake actuators 154 control application of friction brakes at the wheels, respectively, of the vehicle.

Modules of the vehicle may share parameters via a network 162, such as a controller area network (CAN). A CAN may also be referred to as a car area network. For example, the network 162 may include one or more data buses. Various parameters may be made available by a given module to other modules via the network 162.

The driver inputs may include, for example, an accelerator pedal position (APP) 166 which may be provided to the ECM 106. The BPP 170 may be provided to the brake control module 150. A position 174 of a park, reverse, neutral, drive lever (PRNDL) may be provided to the TCM 114. An ignition state 178 may be provided to a body control module (BCM) 180. For example, the ignition state 178 may be input by a driver via an ignition key, button, or switch. At a given time, the ignition state 178 may be one of off, accessory, run, or crank.

An infotainment module 183 may output various information via one or more output devices 184. The output devices 184 may include, for example, one or more displays (non-touch screen and/or touch screen), one or more other suitable types of video output devices, one or more speakers, one or more haptic devices, and/or one or more other suitable types of output devices.

The infotainment module 183 may output video via the one or more displays. The infotainment module 183 may output audio via the one or more speakers. The infotainment module 183 may output other feedback via one or more haptic devices. For example, haptic devices may be included with one or more seats, in one or more seat belts, in the steering wheel, etc. Examples of displays may include, for example, one or more displays (e.g., on a front console) of the vehicle, a head up display (HUD) that displays information via a substrate (e.g., windshield), one or more displays that drop downwardly or extend upwardly to form panoramic views, and/or one or more other suitable displays.

The vehicle may include a plurality of external sensors and cameras, generally illustrated in FIG. 1 by 186. One or more actions may be taken based on input from the external sensors and cameras 186. For example, the infotainment module 183 may display video, various views, and/or alerts on a display via input from the external sensors and cameras 186 during driving.

The vehicle may include one or more additional control modules that are not shown, such as a chassis control module, a battery pack control module, etc. The vehicle may omit one or more of the control modules shown and discussed.

Figure 3:
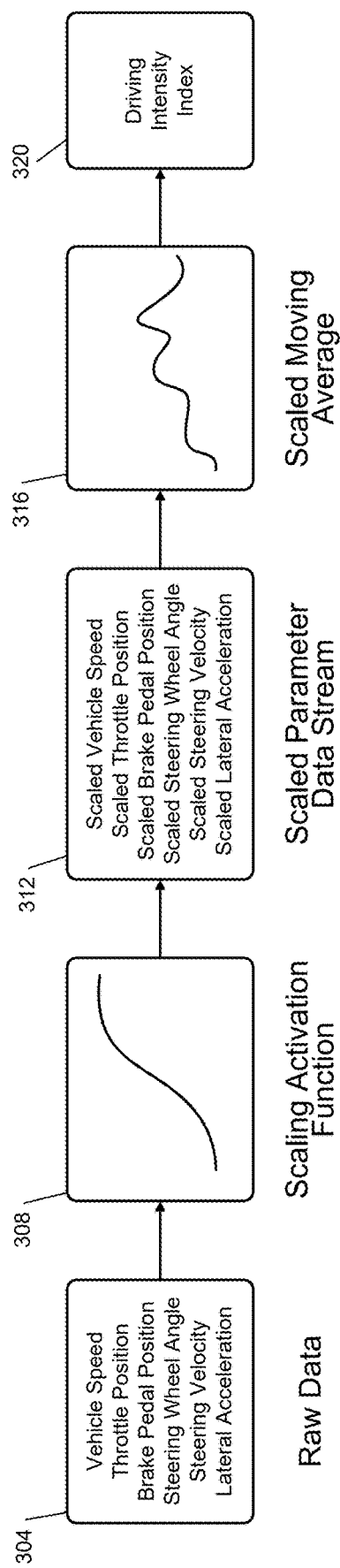
FIG. 3 is a flowchart illustrating an example method for calculating a driving intensity index.

FIG. 3 is a flowchart illustrating an example method for calculating a driving intensity index. At 304, vehicle operating parameters are obtained as raw data. For example, the vehicle control module 20 may be configured to obtain a vehicle speed, a throttle position, a brake pedal position, a steering wheel angle, a steering velocity, a lateral acceleration of the vehicle, etc. These are example vehicle operating parameters, and other embodiments may obtain more or less (or other) vehicle operating parameters.

At 308, a scaling activation function is applied to scale each of the obtained vehicle operating parameters. For example, a sigmoid activation function may be applied to scale each vehicle operating parameter to a scale from zero to one. This results in a scaled parameter data stream at 312.

The scaled parameter data steam may include, for example, a scaled vehicle speed value, a scaled throttle position value, a scaled brake pedal position value, a scaled steering wheel angle value, a scaled steering velocity value, a scaled lateral acceleration of the vehicle value, etc. These are example vehicle operating parameters, and other embodiments may obtain more or less (or other) vehicle operating parameters.

At 316, a moving average of the scaled vehicle operating parameters is calculated. For example, a moving average may be determined over a window of five seconds, ten seconds, one minute, etc. The moving averages may then be combined to determine a driving intensity index at 320, such as via convolution, or any other suitable parameter combination algorithm.

Figure 4:
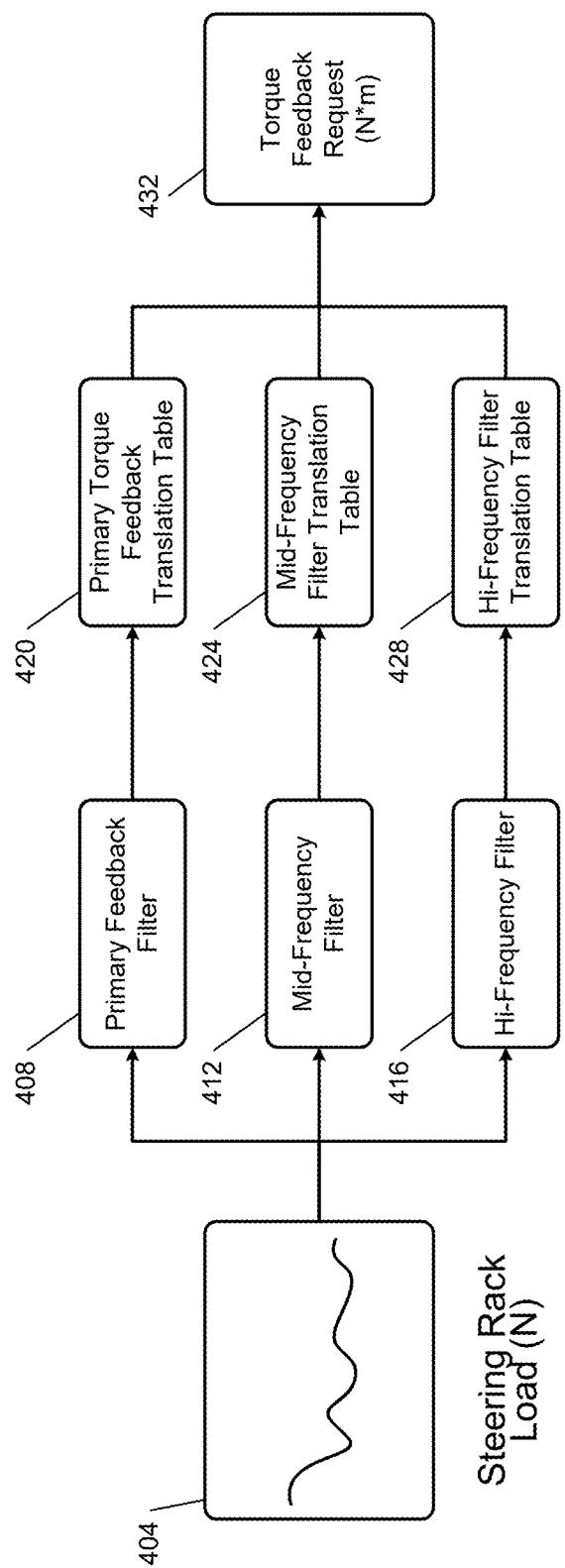
FIG. 4 is a flowchart illustrating an example method for applying a filter to a steering wheel feedback signal.

FIG. 4 is a flowchart illustrating an example method for applying a filter to a steering wheel feedback signal. At 404, a steering rack load is obtained. For example, the steering rack load may include sensed parameters of forces applied to the wheels, a steering actuator or other component mechanically connected with the wheels, etc., based on driving conditions or road conditions.

The steering rack load may be selectively applied to a primary feedback filter 408, a mid-frequency filter 412, and a high frequency filter 416. The primary feedback filter 408 may supply a filtered signal to a primary torque feedback translation table 420, the mid-frequency filter 412 may supply a filtered signal to a mid-frequency filter translation table 424, and the hi-frequency filter 416 may supply a filtered signal to a hi-frequency filter translation table 428.

The outputs of the primary torque feedback translation table 420, the mid-frequency filter translation table 424, and the hi-frequency filter translation table 428, may be combined to determine a torque feedback request 432. The torque feedback request 432 may be used to apply steering feedback to a steering wheel of the vehicle. In some example embodiments, the determined driving intensity index may be used to selectively apply or remove various ones of the primary feedback filter 408, the primary torque feedback translation table 420, the mid-frequency filter 412, the mid-frequency filter translation table 424, the hi-frequency filter 416, and the hi-frequency filter translation table 428.

Figure 5:
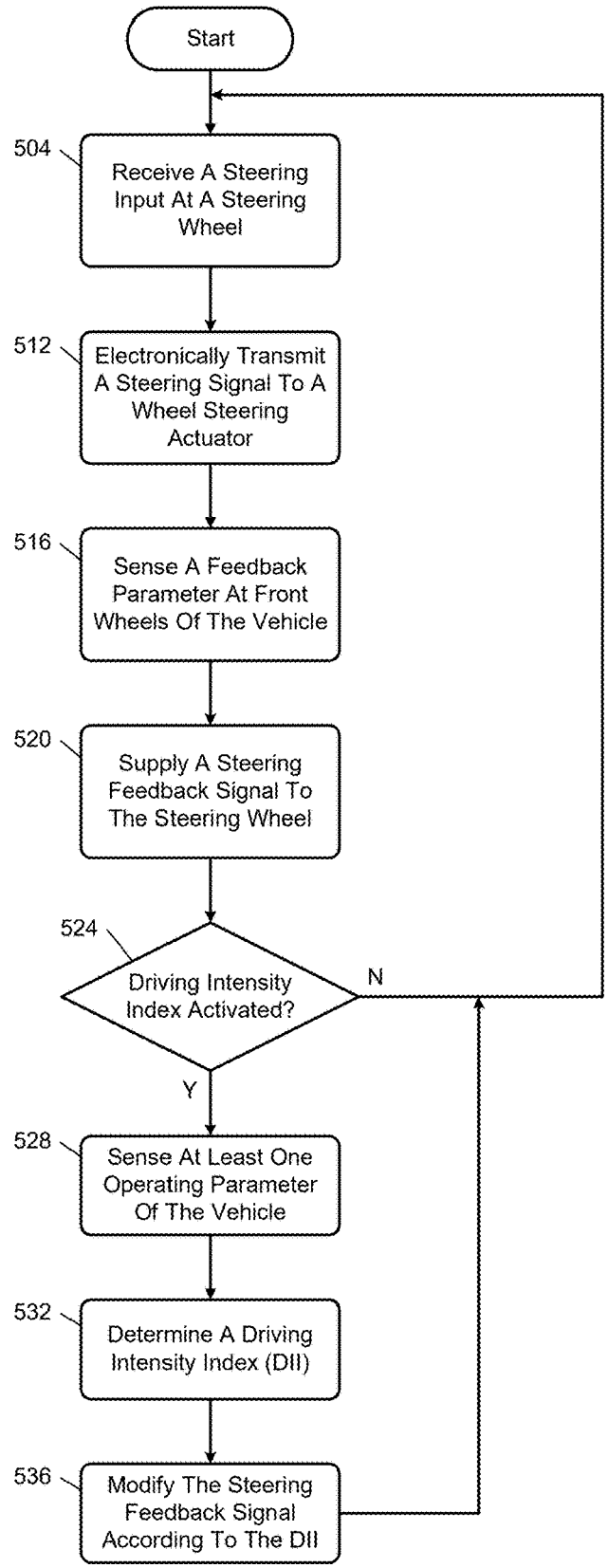
FIG. 5 is a flowchart illustrating an example method for modifying steering wheel feedback in a vehicle steer-by-wire system.

FIG. 5 is a flowchart illustrating an example method for modifying steering wheel feedback in a vehicle steer-by-wire system. The method may be executed by, for example, the vehicle control module 20 of FIG. 1, which may include the steer-by-wire control module 24 and the steering feedback control module 28.

At 504, the vehicle control module 20 is configured to receive a steering input from a driver of a vehicle at a steering wheel. The controller is configured to electronically transmit a steering signal to a wheel steering actuator (such as the wheel steering actuator 26 of FIG. 1), at 512.

At 516, the vehicle control module 20 is configured to sense a feedback parameter at front wheels of a vehicle. For example, the feedback parameter may correspond to road conditions that apply force, vibrations, etc. on the wheels of the vehicle.

The vehicle control module 20 is configured to supply a steering feedback signal to the steering wheel (such as the steering wheel 22 of FIG. 1), at 520. The controller then determines at 524 whether a driving intensity index function has been activated. If not, control returns to 504 to receive another steering input at the steering wheel of the vehicle.

If control determines at 524 that a driving intensity index is activated, control proceeds to 528 to sense at least one operating parameter of the vehicle. At 532, the vehicle control module 532 is configured to determine a driving intensity index (DII), based on the sensed operating parameter(s) of the vehicle.

The vehicle control module 20 is configured to modify the steering feedback signal according to the determined driving intensity index at 536. For example, if the operating parameters indicate aggressive driving, the vehicle control module may allow most or all of the steering feedback signal to be supplied to the steering wheel.

If the operating parameters indicate more casual driving, the vehicle control module may filter most or all of the steering feedback signal, to provide a smoother driving experience to the driver. Control then returns to 504 to receive a next steering input at the steering wheel.

Figure 6:
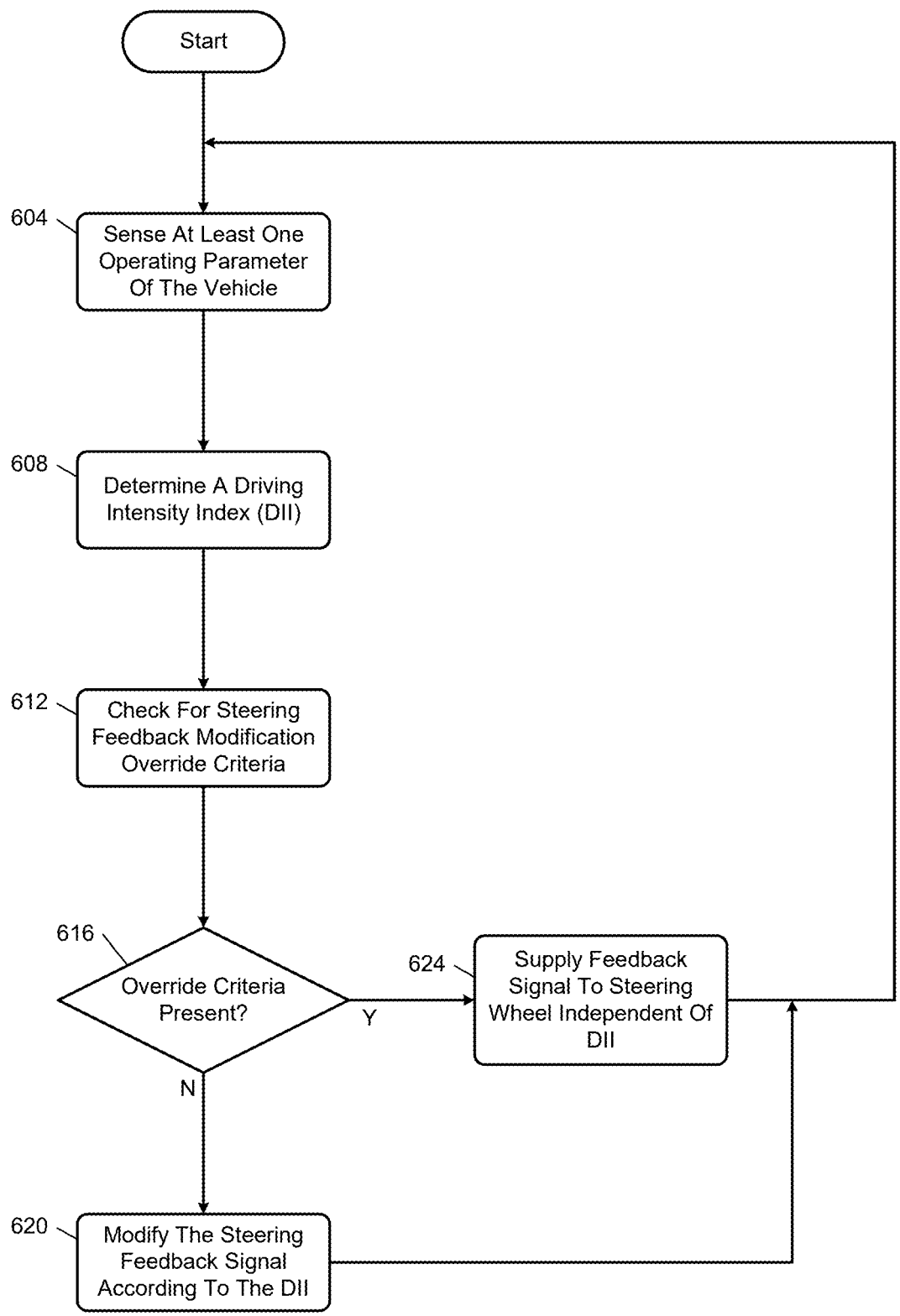
FIG. 6 is a flowchart illustrating an example method for selectively overriding steering wheel feedback modification in a vehicle steer-by-wire system.

FIG. 6 is a flowchart illustrating an example method for selectively overriding steering wheel feedback modification in a vehicle steer-by-wire system. The method may be executed by, for example, the vehicle control module 20 of FIG. 1, which may include the steer-by-wire control module 24 and the steering feedback control module 28.

At 604, the vehicle control module 20 is configured to sense at least one operating parameter of the vehicle. Control then determines a driving intensity index (DII) at 608, based on the sensed at least one operating parameter of the vehicle.

At 612, the vehicle control module 20 is configured to determine whether override criteria are present. For example, in certain criteria conditions, the vehicle control module may be configured to override the filtering of the steering feedback signal supplied to the steering wheel based on the driving intensity index, to allow all (or none) of the steering feedback signal to be supplied to the steering wheel.

For example, the vehicle control module 20 may override the filter setting based on a location of the vehicle, such as setting the steering feedback control signal to a full feedback or maximum feedback amount in response to GPS coordinates indicating the vehicle is at a location of a racetrack, etc.

The vehicle control module 20 may override the filter setting based on a driver mode setting or command (DMC), such as setting the steering feedback control signal to a full feedback or maximum feedback amount in response to a driver selecting a track driving mode or a sport driving mode, etc. When the steer-by-wire control module overrides the filter setting, the full steering feedback may be provided to the driver regardless of the current driving intensity index.

As another example, the vehicle control module 20 may override the filter setting based on a load shed request value. For example, if critical vehicle systems are requesting that non-critical vehicle systems reduce resource usage, the steer-by-wire control module may stop calculating the driving intensity index temporarily, may stop modifying steering feedback, etc.

If control determines at 616 that override criteria are not present, control proceeds to 624 to supply a feedback signal to the steering wheel independent of the driving intensity index. If control determines at 616 that override criteria are present, control proceeds to 620 to modify the feedback signal according to the driving intensity index.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle steer-by-wire system comprising:
    two front wheels of the vehicle;
    a steering wheel adapted to receive a steering input from a driver of the vehicle;
    a steer-by-wire module configured to,
        electronically transmit a steering signal to control a steering orientation of the two front wheels according to the steering input received at the steering wheel,
        sense a feedback parameter of the two front wheels, and
        supply a steering feedback signal to the steering wheel according to the sensed feedback parameter of the two front wheels;
    one or more vehicle sensors configured to sense multiple operating parameters of the vehicle, wherein the multiple operating parameters include a vehicle speed, a throttle position, a brake pedal position, a steering wheel angle, a steering velocity, a lateral acceleration, a driver mode setting, a load shed request value, and a vehicle location; and
    a steering feedback control module configured to,
        receive the multiple operating parameters of the vehicle,
        determine a driving intensity index according to the vehicle speed, the throttle position, the brake pedal position, the steering wheel angle, the steering velocity, the lateral acceleration, the driver mode setting, the load shed request value, and the vehicle location,
        modify the steering feedback signal supplied to the steering wheel by applying a filter to the steering feedback signal according to the determined driving intensity index, and
        override the filter based on global positioning system (GPS) coordinates indicating the vehicle is at a specified location.

2. The vehicle steer-by-wire system of claim 1, further comprising at least one steering actuator configured to control the steering orientation of the front two wheels, wherein the steer-by-wire module is configured to transmit the steering signal to the at least one steering actuator to control the steering orientation of the two front wheels.

3. The vehicle steer-by-wire system of claim 1, wherein the steering feedback control module is configured to:
    receive each of the multiple operating parameters at periodic intervals to define a dataflow for each of the operating parameters; and
    convert values in each dataflow to a same scale to combine the multiple operating parameters.

4. The vehicle steer-by-wire system of claim 3, wherein the steering feedback control module is configured to convert the values in each dataflow using a sigmoid activation function to convert the values to a scale from zero to one.

5. The vehicle steer-by-wire system of claim 3, wherein the steering feedback control module is configured to:
    calculate a moving average of each scaled dataflow; and
    combine moving averages via convolution to determine the driving intensity index on scale from zero to one.

6. The vehicle steer-by-wire system of claim 5, wherein each moving average includes at least a last ten seconds of operating parameters received at the periodic intervals.

7. The vehicle steer-by-wire system of claim 1, wherein the steering feedback control module is configured to override the filter and supply the steering feedback signal to the steering wheel without modification according to at least one of the driver mode setting of the vehicle, and the load shed request value.

8. A vehicle steer-by-wire system comprising:
    two front wheels of the vehicle;
    at least one steering actuator configured to control a steering orientation of the front two wheels;
    a steering wheel adapted to receive a steering input from a driver of the vehicle;
    a steer-by-wire module configured to,
        electronically transmit a steering signal to the at least one steering actuator to control the steering orientation of the two front wheels according to the steering input received at the steering wheel,
        sense a feedback parameter of the two front wheels, and
        supply a steering feedback signal to the steering wheel according to the sensed feedback parameter of the two front wheels;
    one or more vehicle sensors configured to sense multiple operating parameters of the vehicle, wherein the multiple operating parameters include a vehicle speed, a throttle position, a brake pedal position, a steering wheel angle, a steering velocity, a lateral acceleration, a driver mode setting, a load shed request value, and a vehicle location; and
    a steering feedback control module configured to,
        receive the multiple operating parameters of the vehicle,
        determine a driving intensity index according to the vehicle speed, the throttle position, the brake pedal position, the steering wheel angle, the steering velocity, the lateral acceleration, the driver mode setting, the load shed request value, and the vehicle location,
modify the steering feedback signal supplied to the steering wheel by applying a filter to the steering feedback signal according to the determined driving intensity index, and
override the filter based on global positioning system (GPS) coordinates indicating the vehicle is at a specified location.

9. The vehicle steer-by-wire system of claim 8, wherein the steering feedback control module is configured to:
receive each of the multiple operating parameters at periodic intervals to define a dataflow for each of the multiple operating parameters; and
convert values in each dataflow to a same scale to combine the multiple operating parameters.

10. The vehicle steer-by-wire system of claim 9, wherein the steering feedback control module is configured to convert the values in each dataflow using a sigmoid activation function to convert the values to a scale from zero to one.

11. The vehicle steer-by-wire system of claim 9, wherein the steering feedback control module is configured to:
calculate a moving average of each scaled dataflow; and
combine moving averages via convolution to determine the driving intensity index on scale from zero to one.

12. The vehicle steer-by-wire system of claim 11, wherein each moving average includes at least a last ten seconds of operating parameters received at the periodic intervals.

13. A method of operating a vehicle steer-by-wire system, the method comprising:
receiving, at a steering wheel of a vehicle, a steering input from a driver of the vehicle;
electronically transmitting, by a steer-by-wire module, a steering signal to control a steering orientation of two front wheels of the vehicle, according to the steering input received at the steering wheel;
sensing a feedback parameter of the two front wheels;
supplying a steering feedback signal to the steering wheel according to the sensed feedback parameter of the two front wheels;
sensing multiple operating parameters of the vehicle, wherein the multiple operating parameters include a vehicle speed, a throttle position, a brake pedal position, a steering wheel angle, a steering velocity, a lateral acceleration, a driver mode setting, a load shed request value, and a vehicle location;
determining a driving intensity index according to the vehicle speed, the throttle position, the brake pedal position, the steering wheel angle, the steering velocity, the lateral acceleration, the driver mode setting, the load shed request value, and the vehicle location;
modifying the steering feedback signal supplied to the steering wheel by applying a filter to the steering feedback signal according to the determined driving intensity index; and
overriding the filter based on global positioning system (GPS) coordinates indicating the vehicle is at a specified location.

14. The method of claim 13, further comprising overriding the filter and supplying the steering feedback signal to the steering wheel without modification according to at least one of the driver mode setting of the vehicle, and the load shed request value.

* * * * *